United States Patent
Zhang

(10) Patent No.: US 12,135,864 B2
(45) Date of Patent: Nov. 5, 2024

(54) SCREEN CAPTURE METHOD AND APPARATUS, AND ELECTRONIC DEVICE

(71) Applicant: VIVO MOBILE COMMUNICATION CO., LTD., Guangdong (CN)

(72) Inventor: Jin Zhang, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 18/126,843

(22) Filed: Mar. 27, 2023

(65) Prior Publication Data

US 2023/0244363 A1 Aug. 3, 2023

Related U.S. Application Data

(63) Continuation of application No. PCT/CN2021/120651, filed on Sep. 26, 2021.

(30) Foreign Application Priority Data

Sep. 29, 2020 (CN) .......................... 202011050136.5

(51) Int. Cl.
*G06F 3/048* (2013.01)
*G06F 3/0481* (2022.01)
*G06F 3/0484* (2022.01)

(52) U.S. Cl.
CPC .......... *G06F 3/0484* (2013.01); *G06F 3/0481* (2013.01)

(58) Field of Classification Search
CPC .............................. G06F 3/0484; G06F 3/0481
See application file for complete search history.

(56) References Cited

U.S. PATENT DOCUMENTS

| | | | | |
|---|---|---|---|---|
| 2013/0212507 A1* | 8/2013 | Fedoseyeva | ........... | G06Q 30/00 715/765 |
| 2015/0172669 A1* | 6/2015 | Nishiyama | ........... | H04N 19/137 375/240.08 |
| 2018/0074685 A1* | 3/2018 | Peng | ..................... | G06F 3/0485 |
| 2018/0107887 A1* | 4/2018 | Huber, Jr. | ............ | G06V 10/225 |
| 2019/0068997 A1* | 2/2019 | Hellmuth | ......... | H04N 21/23439 |

(Continued)

FOREIGN PATENT DOCUMENTS

| CN | 103593171 A | 2/2014 |
|---|---|---|
| CN | 104899832 A | 9/2015 |

(Continued)

OTHER PUBLICATIONS

First Office Action for Chinese Application No. 202011050136.5, dated Aug. 25, 2021, 10 Pages.

(Continued)

*Primary Examiner* — David Phantana-angkool
(74) *Attorney, Agent, or Firm* — Brooks Kushman P.C.

(57) ABSTRACT

A screen capture method and apparatus as well as an electronic device. The screen capture method includes: in a case that a first display interface is displayed, receiving a first input performed on the first display interface; displaying at least two first screen capture boxes on the first display interface in response to the first input; and in a case that a second input is received, performing a screen capture operation on image content determined by a target screen capture box, and outputting a screenshot, where the target screen capture box includes the first screen capture boxes.

17 Claims, 11 Drawing Sheets

(56) References Cited

U.S. PATENT DOCUMENTS

| | | | | |
|---|---|---|---|---|
| 2019/0197487 A1* | 6/2019 | Jersin | ................... | H04L 51/214 |
| 2022/0101638 A1* | 3/2022 | Bae | ....................... | G06V 20/63 |
| 2022/0294992 A1* | 9/2022 | Manzari | ............... | H04N 23/633 |

FOREIGN PATENT DOCUMENTS

| | | | |
|---|---|---|---|
| CN | 105549891 | A | 5/2016 |
| CN | 105718137 | A | 6/2016 |
| CN | 107515715 | A | 12/2017 |
| CN | 109445894 | A | 3/2019 |
| CN | 111638844 | A | 9/2020 |
| CN | 112181252 | A | 1/2021 |
| JP | 2013171365 | A | 9/2013 |
| WO | 2014122792 | A1 | 8/2014 |
| WO | 2016106997 | A1 | 7/2016 |

OTHER PUBLICATIONS

International Search Report and Written Opinion for Application No. PCT/CN2021/120651, dated Dec. 29, 2021, 9 Pages.
First Office Action for Japanese Application No. 2023-519221, dated May 15, 2024, 4 Pages.

\* cited by examiner

SCREEN CAPTURE METHOD AND APPARATUS, AND ELECTRONIC DEVICE

CROSS-REFERENCE TO RELATED APPLICATIONS

This application is a continuation of PCT International Application No. PCT/CN2021/120651 filed on Sep. 26, 2021, which claims priority to Chinese Patent Application No. 202011050136.5 filed on Sep. 29, 2020, which are incorporated herein by reference in their entireties.

TECHNICAL FIELD

This application relates to the field of communication technologies, and in particular, to a screen capture method and apparatus as well as an electronic device.

BACKGROUND

With the development of Internet technology, electronic devices such as mobile phones have become one of indispensable electronic products in people's daily life, and screen capture is a common daily function of a mobile phone. Currently, a screen capture method is usually used to capture an entire display interface. Then, a user is allowed to adjust a size of a screen capture box to select a screen capture region. If the user requires screenshots of different regions of the same interface, the user needs to perform a plurality of screen capture operations. It can be learned that the existing screen capture method has a problem that the operation is complex.

SUMMARY

According to a first aspect, an embodiment of this application provides a screen capture method, including:
  in a case that a first display interface is displayed, receiving a first input performed on the first display interface;
  displaying at least two first screen capture boxes on the first display interface in response to the first input; and
  in a case that a second input is received, performing a screen capture operation on image content determined by a target screen capture box, and outputting a screenshot, where
  the target screen capture box includes the first screen capture boxes.

According to a second aspect, an embodiment of this application further provides a screen capture apparatus, including:
  a receiving module, configured to: in a case that a first display interface is displayed, receive a first input performed on the first display interface;
  a display module, configured to display at least two first screen capture boxes on the first display interface in response to the first input; and
  an output module, configured to: in a case that a second input is received, perform a screen capture operation on image content determined by a target screen capture box, and output a screenshot, where
  the target screen capture box includes the first screen capture boxes.

According to a third aspect, an embodiment of this application provides an electronic device. The electronic device includes a processor, a memory, and a program or instructions stored in the memory and executable by the processor. When the program or instructions are executed by the processor, the steps of the screen capture method according to the first aspect are implemented.

According to a fourth aspect, an embodiment of this application provides a readable storage medium. The readable storage medium stores a program or instructions. When the program or instructions are executed by a processor, the steps of the screen capture method according to the first aspect are implemented.

According to a fifth aspect, an embodiment of this application provides a chip. The chip includes a processor and a communication interface. The communication interface is coupled to the processor. The processor is configured to run a program or instructions to implement the screen capture method according to the first aspect.

DETAILED DESCRIPTION

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

The terms "first", "second", and the like in this specification and claims of this application are used to distinguish between similar objects instead of describing a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the quantity of objects is not limited. For example, there may be one or more first objects. In addition, in the specification and claims, "and/or" represents at least one of connected objects, and a character "I" generally represents an "or" relationship between associated objects.

With reference to the accompanying drawings, a screen capture method and apparatus as well as an electronic device provided in the embodiments of this application are described below in detail by using specific embodiments and application scenarios thereof.

Figure 1A:
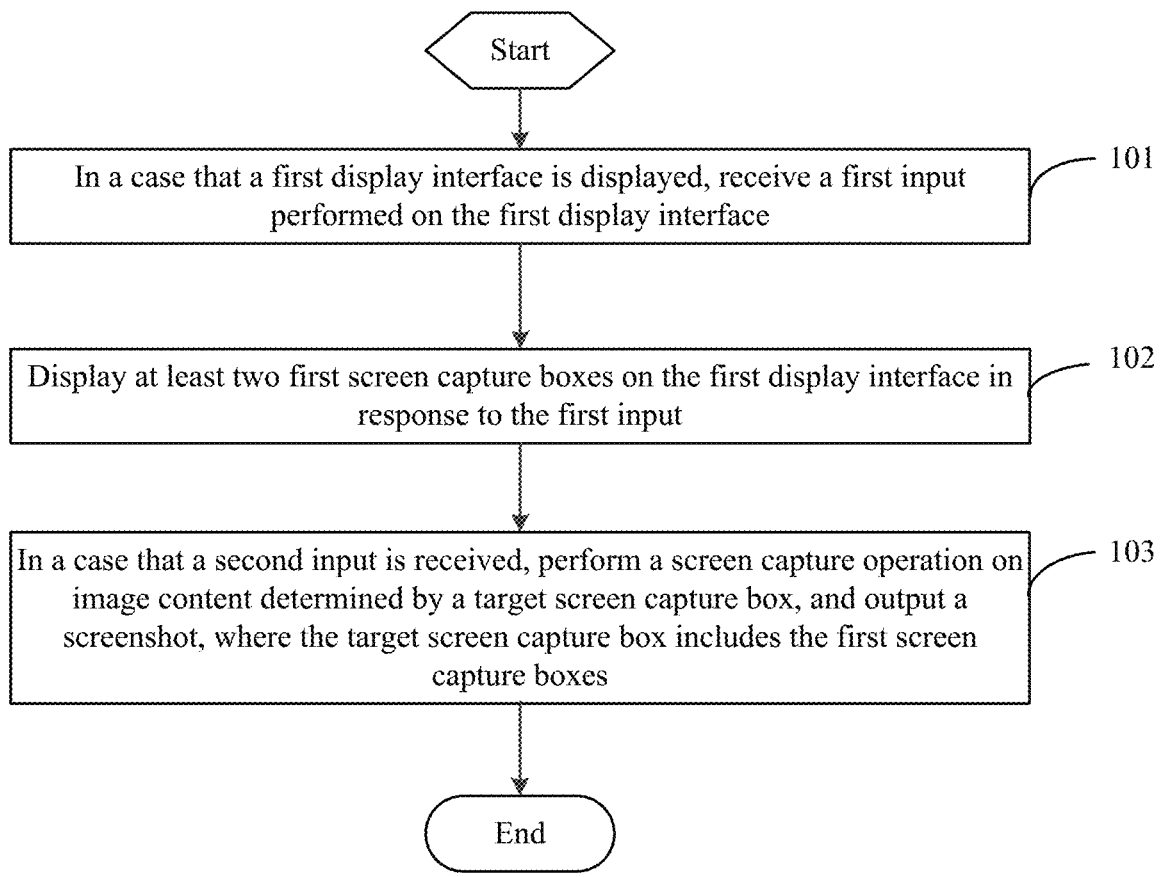
FIG. 1a is a flowchart of a screen capture method according to an embodiment of this application.

FIG. 1a is a flowchart of a screen capture method according to an embodiment of this application. As shown in FIG. 1a, the screen capture method includes the following steps.

Step 101: In a case that a first display interface is displayed, receive a first input performed on the first display interface.

In this embodiment of this application, the first display interface may be a running interface of an application, for example, a play interface of a video application, a text interface of a read application, and a chat interface of a social application. The first display interface is not limited in this application.

Optionally, the first input may be a touch input performed on the first display interface, for example, double tapping, long pressing, or swiping along a preset track, or may be a voice input. This is not limited in this application.

Step 102: Display at least two first screen capture boxes on the first display interface in response to the first input.

In other words, in a case that the first display interface is displayed, the at least two first screen capture boxes are displayed on the first display interface when the first input performed on the first display interface is received. For example, when a user presses two regions of the first display interface with two fingers at the same time, first screen capture boxes are displayed corresponding to the two regions after the user releases the two regions, that is, two first screen capture boxes are displayed. In this way, the user can obtain screenshots of image content in at least two regions of the first display interface by performing a screen capture operation once.

It should be noted that, the screen capture method provided in this embodiment of this application may be executed by a screen capture apparatus, for example, a mobile phone or a tablet computer that has a screen capture function.

In this embodiment of this application, the screen capture apparatus may be added with a "multi-region screen capture" function. In a case that this function is enabled, a response can be made to the first input of the user. Optionally, the user may enable the "multi-region screen capture" function by performing a preset input. For example, the screen capture apparatus enables the "multi-region screen capture" function when receiving user's four-finger upward swiping operation on a display screen. Then, the response can be made to the first input of the user to display at least two first screen capture boxes on the first display interface.

It may be understood that if the screen capture apparatus has not enabled the "multi-region screen capture" function, the response cannot be made to the first input of the user. In this way, the screen capture apparatus can respond to the first input of the user only when a specific function is enabled, thereby avoiding false triggering of the user and ensuring normal use of the screen capture apparatus.

Step 103: In a case that a second input is received, perform a screen capture operation on image content determined by a target screen capture box, and output a screenshot, where the target screen capture box includes the first screen capture boxes.

It should be noted that, in a case that the first input is received, the screen capture apparatus only displays the at least two first screen capture boxes on the first display interface, without performing a screen capture operation on the at least two first screen capture boxes. When the second input is received, screen capture operations can be performed on image content determined by the at least two first screen capture boxes, to obtain screenshots.

Optionally, the target screen capture box is the at least two first screen capture boxes; and step 103 may include:
separately performing a screen capture operation on image content determined by the at least two first screen capture boxes, and outputting at least two screenshots, where a quantity of the at least two screenshots is the same as a quantity of the at least two first screen capture boxes.

Specifically, when the first display interface displays the at least two first screen capture boxes, if the second input of the user is received, for example, the user double taps a screen, screen capture operations are respectively performed on the image content determined by the at least two first screen capture boxes, to obtain at least two screenshots. In other words, a quantity of screenshots to be obtained depends on a quantity of first screen capture boxes. In this way, the user can obtain at least two screenshots of image content in different regions of a same display interface by performing an operation once, instead of performing the screen capture operation a plurality of times. This simplifies user's operations, and improves user's operation experience.

Figure 1B:
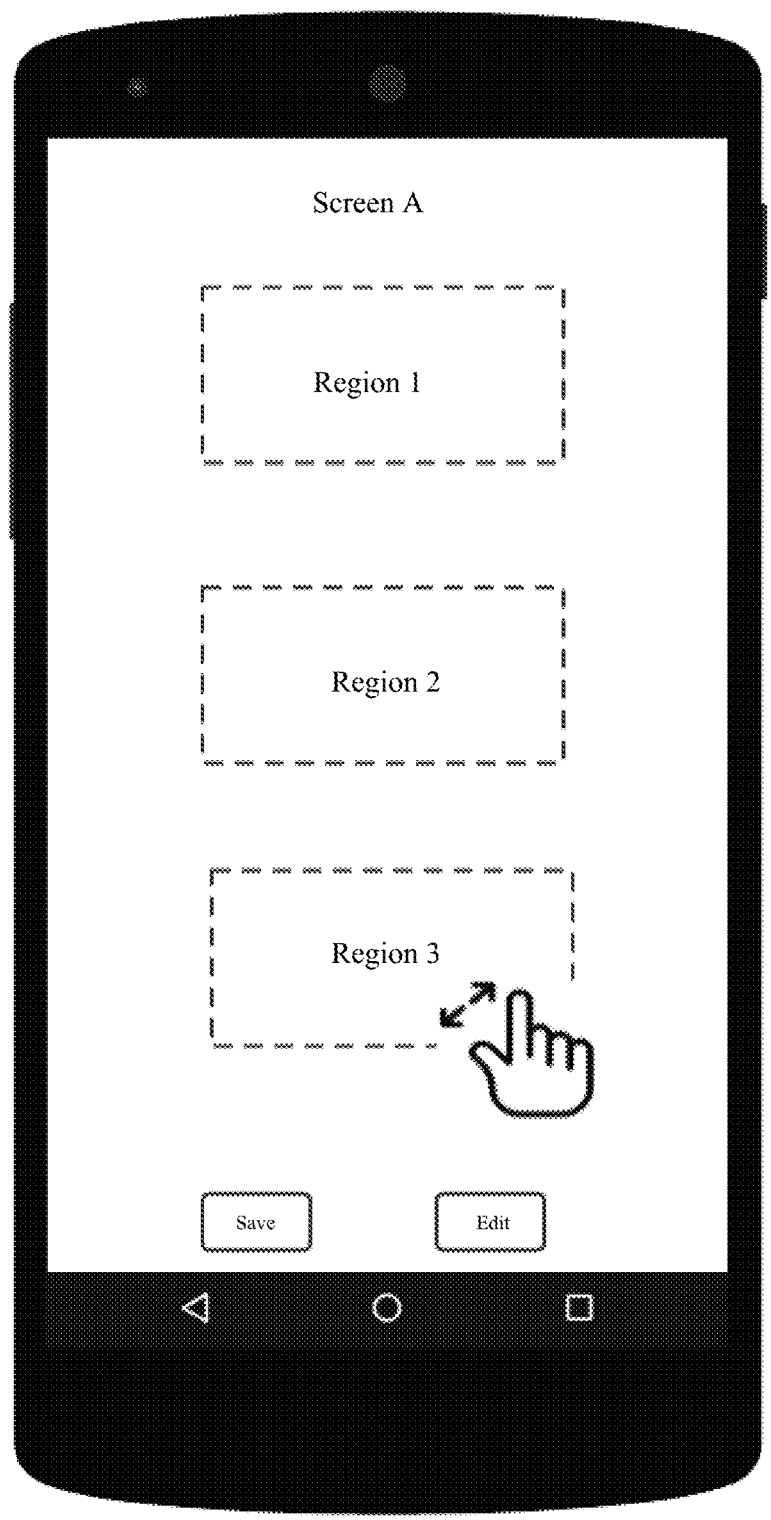
FIG. 1b is a first schematic diagram of a scenario of a display interface of a screen capture apparatus to which the screen capture method provided in FIG. 1a is applied.

As shown in FIG. 1B, three first screen capture boxes "Region 1", "Region 2", and "Region 3" are displayed on the first display interface. A lower end of the first display interface displays a "Save" button and an "Edit" button. The second input may be tapping the "Save" button by the user. In this case, screen capture operations are respectively performed on image content determined by the three first screen capture boxes. Then, three screenshots respectively corresponding to "Region 1", "Region 2", and "Region 3" are obtained.

According to the screen capture method provided in this embodiment of this application, in a case that a first display interface is displayed, at least two first screen capture boxes can be displayed based on a first input of a user; and when a second input is received, screen capture operations can be performed on image content determined by target screen capture boxes in the at least two first screen capture boxes, thereby obtaining screenshots. In this way, the user can obtain screenshots of different regions of a same display interface by performing a screen capture operation once, instead of performing the screen capture operation on image content on the same interface a plurality of times. This effectively simplifies user's operations, makes the screen capture operation more flexible, and improves the efficiency of screen capture processing.

Optionally, before the second input is received, sizes and positions, on the first display interface, of the at least two first screen capture boxes may be changed based on user's input operation. For example, the user may drag any one of the first screen capture boxes, to change a position of the first screen capture box on the first display interface. Accordingly, image content in the first screen capture box is also updated to image content corresponding to a changed position. In this way, the size and display position of the first screen capture box can be adjusted based on the user's operation, and the image content in the first screen capture box can also be adjusted, making the screen capture operation more flexible and bringing better operation experience to the user.

Optionally, before step 103, the method further includes:
receiving a third input; and
performing image editing on image content in the first screen capture boxes in response to the third input.

In this implementation, in a case that the first display interface displays the at least two first screen capture boxes, if the third input of the user is received, the image editing is performed on the image content in the first screen capture box.

As shown in FIG. 1B, three first screen capture boxes "Region 1", "Region 2", and "Region 3" are displayed on the first display interface. A lower end of the first display interface displays a "Save" button and an "Edit" button. The third input may be tapping the "Edit" button by the user. Alternatively, the third input may be performing a two-finger pinch input operation on one of the first screen capture boxes by the user. Certainly, the third input may be in another operation form. This is not limited in this application.

Figure 1C:
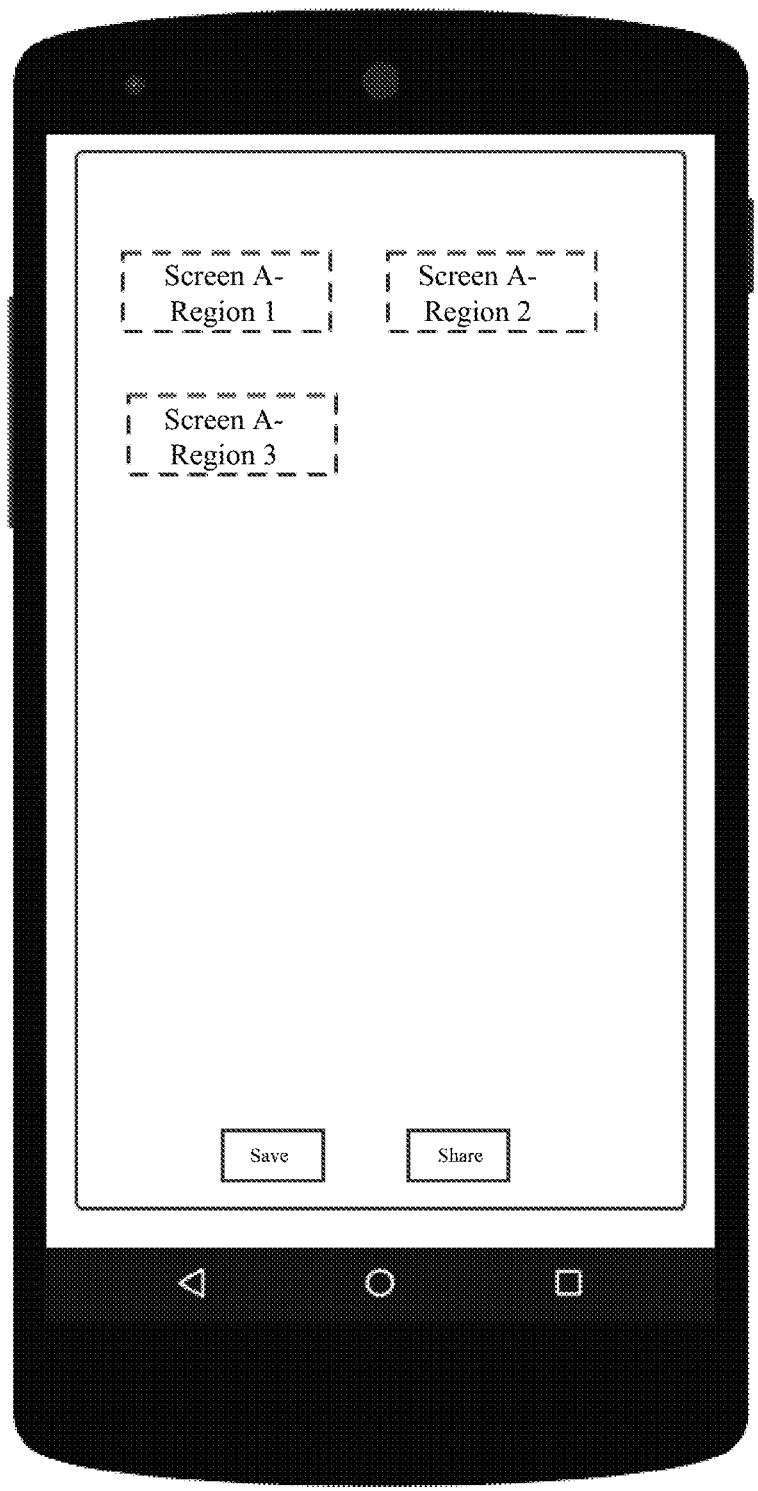
FIG. 1c is a second schematic diagram of a scenario of a display interface of a screen capture apparatus to which the screen capture method provided in FIG. 1a is applied.

As shown in FIG. 1c, the first display interface may further display a second control based on user's operation. The second control may be a frame displayed on an edge of the first display interface. The at least one first screen capture box is disposed in the frame. When the third input is received, for example, when a single-tap operation for the second control is received, the user is allowed to perform the image editing on the image content in the first screen capture box. The image editing includes adjusting display brightness of the image content, adjusting a display size, splicing images, and the like.

Alternatively, the third input may be an editing operation for any first screen capture box of the at least two first screen capture boxes. As shown in FIG. 1B, when adjustment for display brightness of image content in the "Region 1" is received, display brightness of image content in the other two first screen capture boxes is adjusted synchronously. In other words, the user can implement unified image editing for all the first screen capture boxes by performing the image editing operation on an image in any one of the first screen capture boxes. In this way, user's operations are further simplified, thereby improving image processing efficiency more effectively.

In this embodiment of this application, a quantity of the at least two first screen capture boxes is two; the first screen capture boxes may include a first screen capture sub-box and a second screen capture sub-box; and before step 103, the method may further include:
splicing first sub-image content in the first screen capture sub-box and second sub-image content in the second screen capture sub-box in a case that a fourth input performed on the first screen capture sub-box and the second screen capture sub-box is received, where the screenshot includes the first sub-image content and the second sub-image content.

It should be noted that the first screen capture sub-box and the second screen capture sub-box may be any two of the first screen capture boxes. In this implementation, in a case that the first display interface displays the at least two first screen capture boxes, any two of the first screen capture boxes can be spliced based on the fourth input of the user.

Figure 1D:
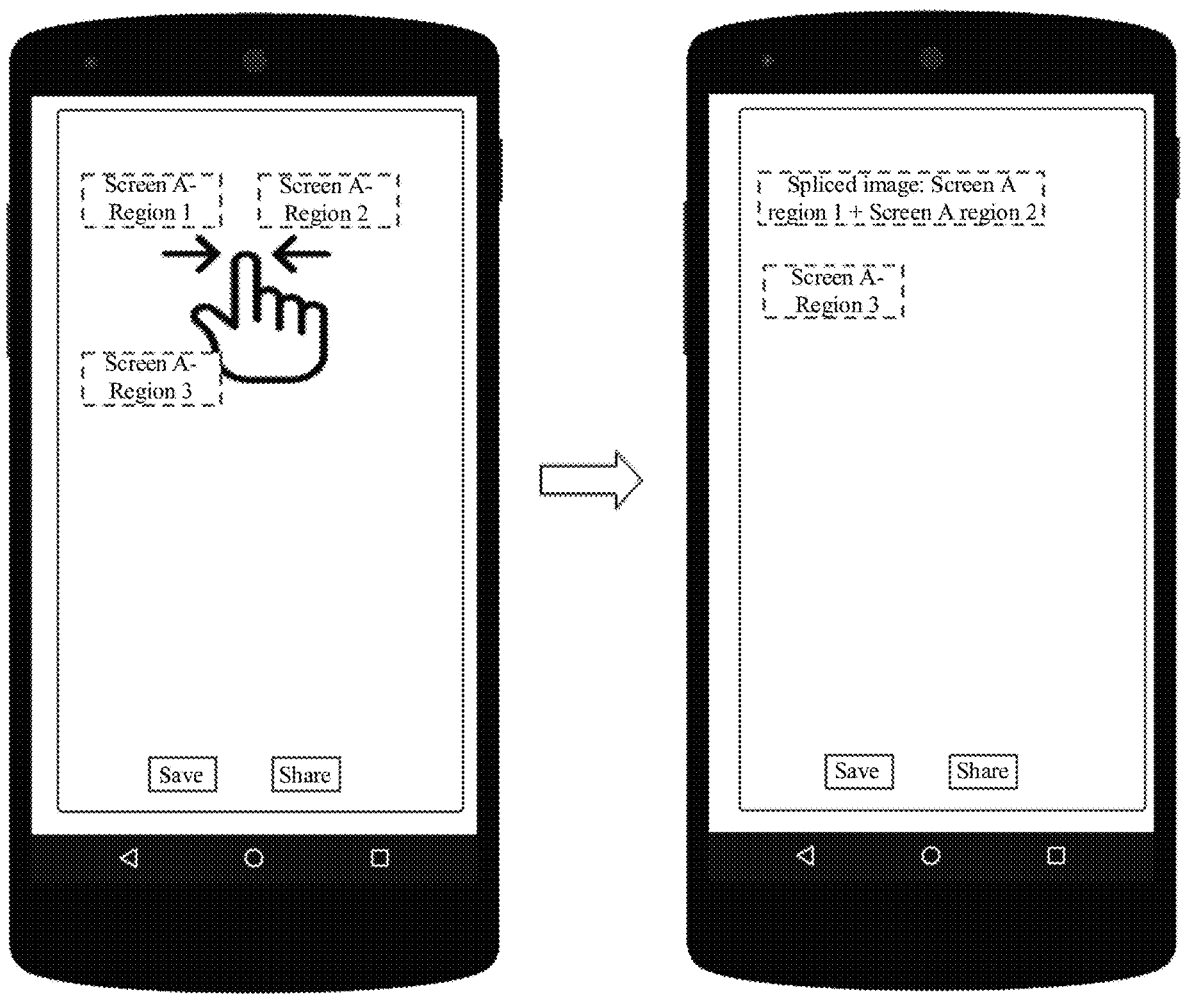
FIG. 1d is a third schematic diagram of a scenario of a display interface of a screen capture apparatus to which the screen capture method provided in FIG. 1a is applied.

As shown in FIG. 1d, the fourth input may be dragging, by the user, the first screen capture sub-box to a position connected to the second screen capture sub-box; or the fourth input may be performing, by the user, a pinch operation on the first screen capture sub-box and the second screen capture sub-box. In response to the fourth input, the first sub-image content in the first screen capture sub-box and the second sub-image content in the second screen capture sub-box are spliced to form a spliced image.

It should be noted that, a quantity of the first screen capture sub-box or the second screen capture sub-box is not limited to one in this application. For example, the quantity of the first screen capture sub-box is two. In this case, image content in three screen capture boxes can be spliced based on the fourth input of the user. The quantities of the first screen capture sub-box and the second screen capture sub-box may be determined based on user's operations. For example, selecting operations performed by the user on first screen capture boxes are received before the fourth input is received. The selected first screen capture boxes are used as the first screen capture sub-box and the second screen capture sub-box.

In this embodiment of this application, in a case that the first display interface is displayed, at least two first screen capture boxes can be displayed based on the first input of the user; screenshots of image content in at least two different regions of the first display interface can be obtained at the same time; and image content in the at least two first screen capture boxes can be spliced based on the fourth input of the user, to complete the screen capture operation and output a spliced screenshot. In the prior art, a first display interface can display only one screen capture box at a time. As a result, a user needs to perform a screen capture operation on the first display interface a plurality of times, to splice image content in different display regions of the first display interface. Therefore, the solution provided in this application is simpler to operate, and the user does not need to perform a screen capture operation on image content in different regions of a same display interface a plurality of times. This effectively improves efficiency of screen capture processing, and brings better use experience for the user.

Optionally, before step 103, the method may further include:
in a case that a fifth input is received, displaying a second display interface, and displaying a first control on the second display interface;
displaying at least two second screen capture boxes on the second display interface in a case that a sixth input performed on the second display interface is received; and
displaying a target editing interface in a case that a seventh input performed on the first control is received, where the target editing interface includes the target screen capture box, and the target screen capture box includes the first screen capture boxes and the second screen capture boxes.

Figure 1E:
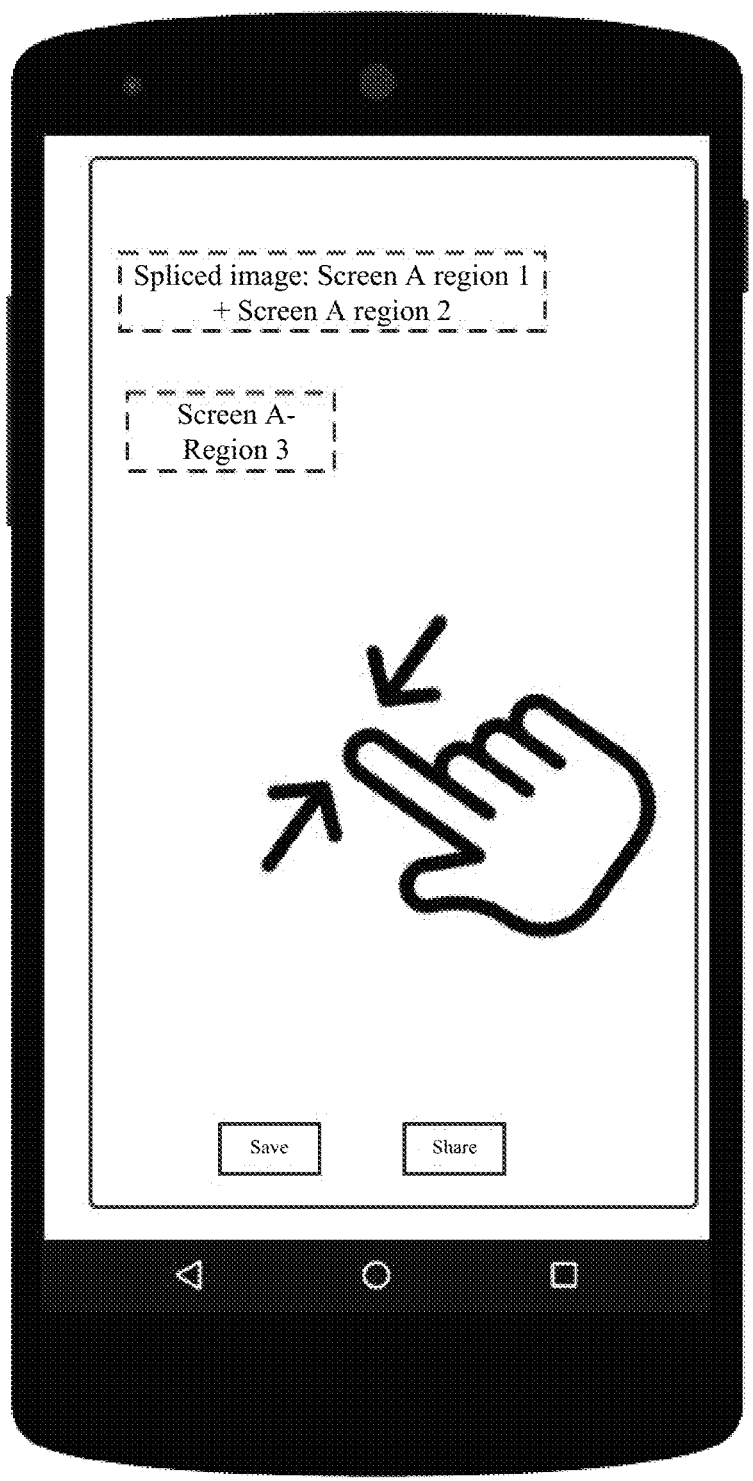
FIG. 1e is a fourth schematic diagram of a scenario of a display interface of a screen capture apparatus to which the screen capture method provided in FIG. 1a is applied.

In this implementation, in a case that the first display interface is displayed, and the at least two first screen capture boxes are displayed on the first display interface based on the first input of the user, if the fifth input for exiting the first display interface or enabling another application is received, the screen capture apparatus may jump to a second display interface, where the second display interface may be a running interface, a desktop, or the like of the another application. As shown in FIG. 1e, in a case that the first display interface is displayed, if a two-finger pinch operation performed on blank spaces of the first display interface is received, the screen capture apparatus jumps to the second display interface (screen B in FIG. 1f); and the first control (a "Floating ball" in FIG. 1f, where the "Floating ball" may display a thumbnail of the first display interface, or display the first screen capture box) is displayed on the second display interface.

Figure 1F:
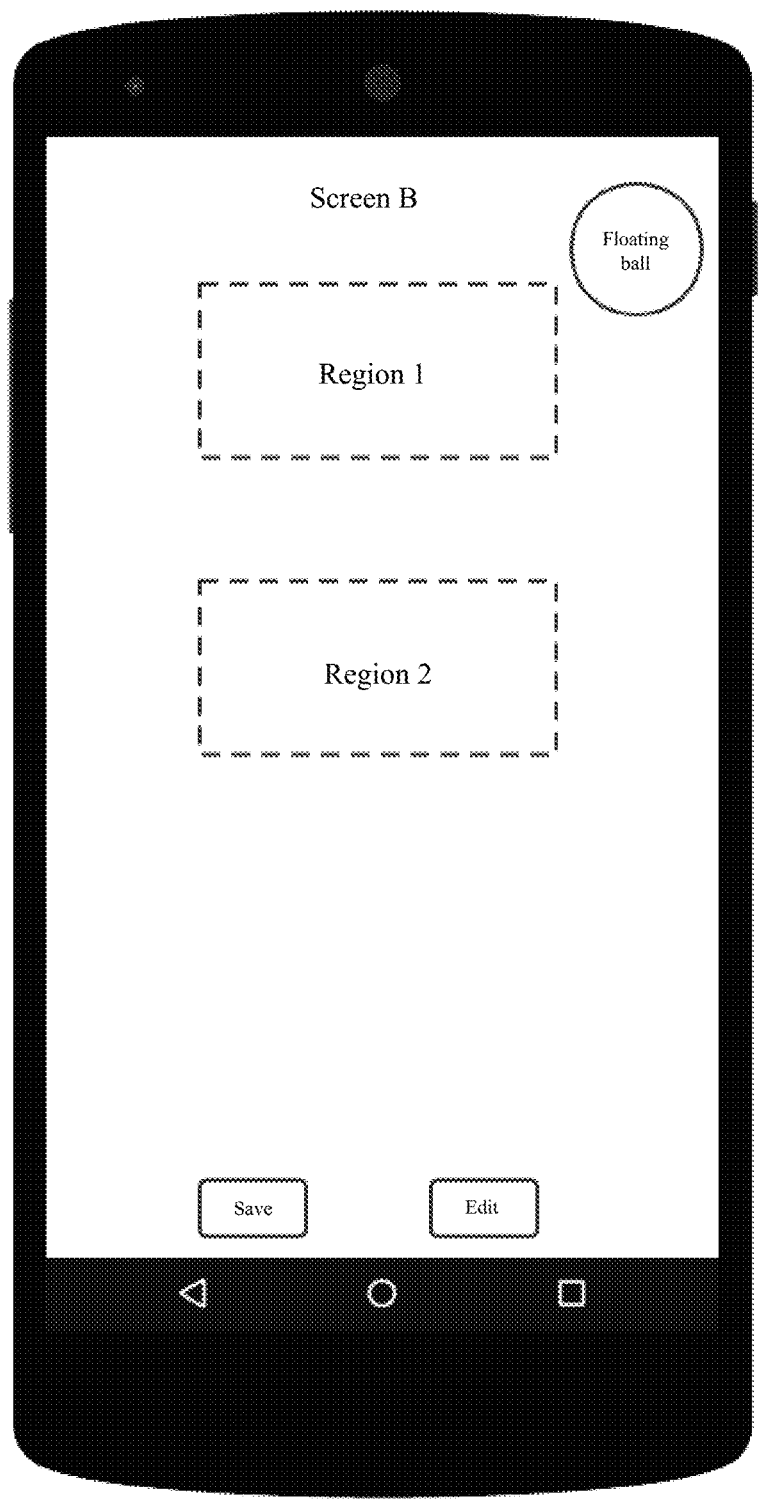
FIG. 1f is a fifth schematic diagram of a scenario of a display interface of a screen capture apparatus to which the screen capture method provided in FIG. 1a is applied.

In a case that the second display interface is displayed, the user is allowed to perform a screen capture operation on image content in at least two different regions of the second display interface by performing the sixth input. Specifically, if the sixth input performed on the second display interface is received, the second display interface displays at least two second screen capture boxes. As shown in FIG. 1f, the second display interface (screen B) displays two second screen capture boxes "Region 1" and "Region 2". The second display interface may also display a "Save" button and an "Edit" button, which help the user to edit or save screenshots of image content in the at least two second screen capture boxes. It should be noted that the sixth input may be the same as the first input, for example, an operation of double tapping the screen. Certainly, the sixth input may alternatively be different from the first input. This is not specifically limited in this application.

In this implementation, the second display interface further displays the first control (for example, the "Floating ball" in FIG. 1f), which helps the user to edit the first screen capture box and the second screen capture box by using the first control. It may be understood that, in a case that the second display interface is displayed, if the user wants to save image content in the first screen capture box in the original first display interface, or perform simultaneous editing operations such as splicing and display parameter adjustment on image content in the first screen capture box and the second screen capture box, the user may perform the seventh input on the first control to jump to the target editing interface. For example, after the user taps or long presses the first control, the screen capture apparatus displays the target editing interface. The target editing interface includes at least two first screen capture boxes used for screen capture operations of image content in the first display interface, and at least two second screen capture boxes used for screen capture operations of image content in the second display interface, so that it is convenient for the user to splice or edit image content obtained after screen capture operations are performed on two different display interfaces.

Optionally, after the target editing interface is displayed, before step 103, the method may further include:

splicing first image content in at least one of the first screen capture boxes and second image content in at least one of the second screen capture boxes in a case that an eighth input performed on the target editing interface is received, where the screenshot includes the first image content and the second image content.

Figure 1G:
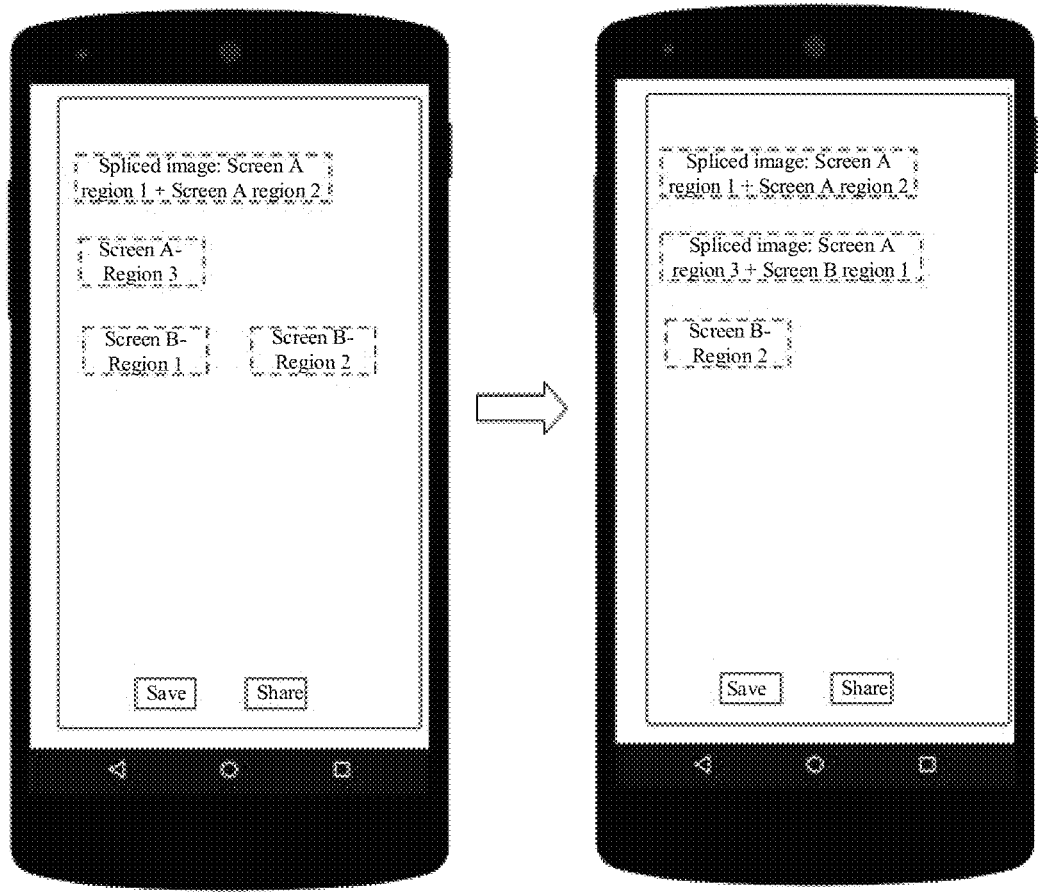
FIG. 1g is a sixth schematic diagram of a scenario of a display interface of a screen capture apparatus to which the screen capture method provided in FIG. 1a is applied.

As shown in FIG. 1g, the target editing interface displays a first screen capture box "Screen A region 3" and a first screen capture box formed by splicing "Screen A region 1" and "Screen A region 2", and further displays two second screen capture boxes "Screen B region 1" and "Screen B region 2". Any two of the screen capture boxes can be spliced when the fifth input performed by the user on the two screen capture boxes is received. For example, when "Screen B region 1" is dragged to a position connected to "Screen A region 3", the two screen capture boxes are spliced into one, and image content in the two screen capture boxes is also spliced. Alternatively, in a case that the fourth input is received, an editing operation can be performed on display content displayed in a screen capture box on the target editing interface, for example, adjusting a size of the screen capture box, or adjusting display parameters of the image content in the screen capture box.

In this embodiment of this application, in a case that the first display interface displays at least two first screen capture boxes, based on an input operation of the user, at least two second screen capture boxes may be further obtained by performing a screen capture operation on image content in another display interface, and an operation such as splicing or editing can be performed on image content in the first screen capture boxes and the second screen capture boxes, to obtain a screenshot. In this way, a user can splice screen capture boxes before obtaining a screenshot, without performing a screen capture operation a plurality of times. Different pieces of image content in different display interfaces are spliced by splicing screen capture boxes, so that user's operations are simplified, screen capture processing efficiency is also improved efficiently, and better operation experience is brought to the user.

Figure 1H:
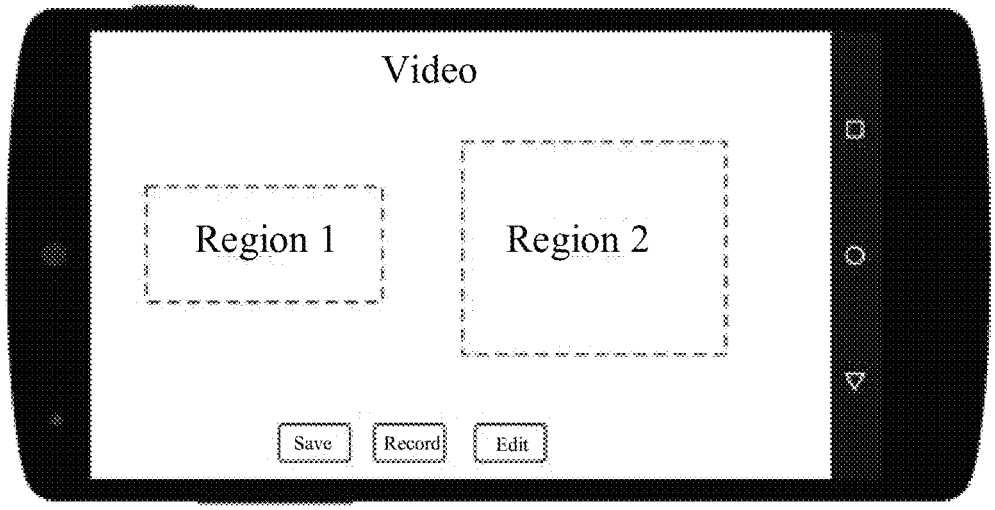
FIG. 1h is a seventh schematic diagram of a scenario of a display interface of a screen capture apparatus to which the screen capture method provided in FIG. 1a is applied.
Figure 1I:
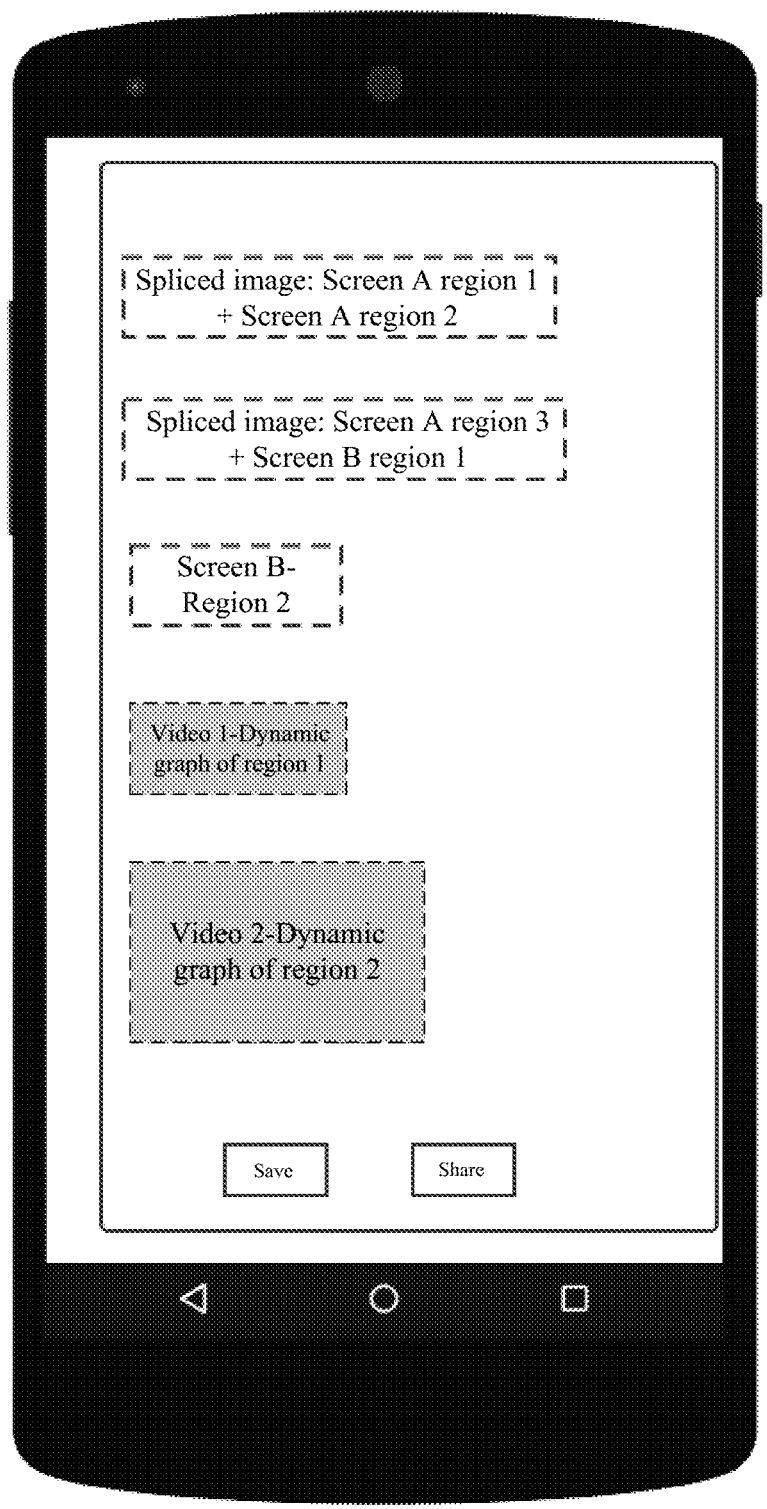
FIG. 1i is an eighth schematic diagram of a scenario of a display interface of a screen capture apparatus to which the screen capture method provided in FIG. 1a is applied.

It should be noted that the first display interface or the second display interface in this embodiment of this application may alternatively be a video play interface. As shown in FIG. 1h, the screen capture operation may alternatively be a screen recording operation, namely, recording a video being played in the video play interface. In a case that a plurality of screen capture boxes are displayed on a display interface (such as the first display interface, the second display interface, or the target editing interface), as shown in FIG. 1i, different screen capture boxes can also be spliced based on an input operation of the user. Then, video content and/or image content in the screen capture boxes is spliced. For a specific implementation principle and process, refer to the descriptions in the foregoing implementations. Details are not described herein again.

In this embodiment of this application, after step 103, the method may further include:

in a case that a ninth input performed on a target screenshot is received, displaying an indication label associated with the target screenshot, where the indication label is used to indicate a target application corresponding to the target screenshot.

In this embodiment of this application, after the screen capture apparatus completes the screen capture operation on the target screen capture box based on the second input of the user, and obtains the screenshot, the screen capture apparatus may record source information of the screenshot. The source information may be a source of the screenshot. For example, if the screenshot is a screenshot of a web page in a search application, the source information of the screenshot may be a website of the web page.

It may be understood that the screen capture apparatus can save the screenshot. If the user wants to obtain the source information of the screenshot when viewing the screenshot, an indication label associated with the screenshot can be displayed by long pressing the screenshot. The indication label is used to indicate the target application corresponding to the target screenshot, that is, the source information of the screenshot. Then, the user can visually learn the source of the screenshot, thereby better understanding the screenshot. It should be noted that the target screenshot may be any screenshot output by the screen capture apparatus.

Further, after the displaying an indication label associated with the target screenshot, the method further includes:

displaying a target running interface of the target application in a case that on a tenth input performed on the indication label is received, where the target running interface is the first display interface.

In other words, in a case that the indication label associated with the target screenshot is displayed, if a tenth input performed by the user on the indication label is received, for example, long pressing the indication label, a target running interface of the target application indicated by the indication label is displayed. Moreover, the target running interface is the first display interface from which the target screenshot is obtained.

Figure 1J:
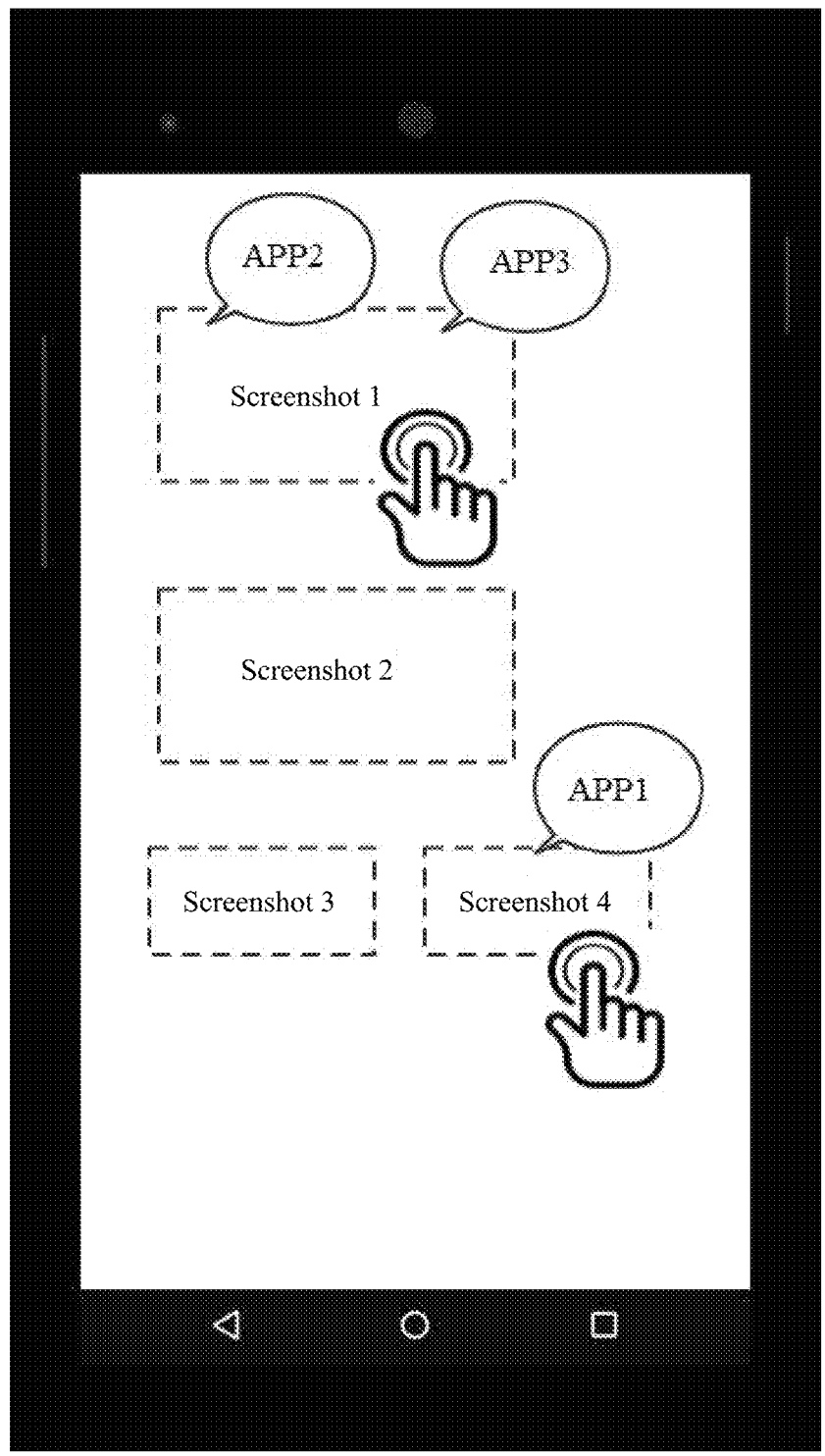
FIG. 1j is a ninth schematic diagram of a scenario of a display interface of a screen capture apparatus to which the screen capture method provided in FIG. 1a is applied.

For example, the first display interface is a video play interface A of a video application APP1. After the first input and the second input are performed on the video play interface, a screenshot 3 and a screenshot 4 may be obtained and saved. As shown in FIG. 1j, when the screen capture apparatus displays a plurality of saved screenshots, for example, displays "Screenshot 1", "Screenshot 2", "Screenshot 3", and "Screenshot 4", if the user long presses the "Screenshot 4", an associated indication label "APP1" is displayed on the "Screenshot 4". When the user long presses the indication label, a display interface of the screen capture apparatus jumps to the video play interface A of APP1. It should be noted that, in a case that the target screenshot is a spliced image, indication labels corresponding to two screenshots from which the spliced image is obtained are displayed. In other words, two indication labels are displayed on "Screenshot 1", which respectively indicate source pages of two screenshot that form this screenshot.

In this embodiment of this application, the user can quickly switch to the source page corresponding to the screenshot by triggering the indication label. This helps the user to view the source page, and effectively saves time spent by the user in searching for the source page by using an application. Then, the screenshot can well save a record of using the application by the user. This provides a simplified operation manner for the user to search for the application and related information later, and brings a better operation experience to the user.

It should be noted that, the screen capture method provided in the embodiments of this application may be performed by a screen capture apparatus or a control module that is in the screen capture apparatus and that is configured to perform the screen capture method. In this embodiment of this application, the screen capture method being performed by a screen capture apparatus is used as an example to describe the screen capture apparatus provided in the embodiments of this application.

Figure 2:
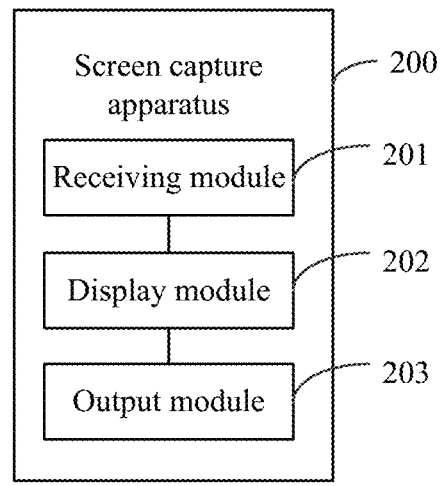
FIG. 2 is a structural diagram of a screen capture apparatus according to an embodiment of this application.

FIG. 2 is a structural diagram of a screen capture apparatus according to an embodiment of this application. As shown in FIG. 2, the screen capture apparatus 200 includes:
a receiving module 201, configured to: in a case that a first display interface is displayed, receive a first input performed on the first display interface;
a display module 202, configured to display at least two first screen capture boxes on the first display interface in response to the first input; and
an output module 203, configured to: in a case that a second input is received, perform a screen capture operation on image content determined by a target screen capture box, and output a screenshot, where the target screen capture box includes the first screen capture boxes.

Optionally, the screen capture apparatus 200 further includes an editing module, configured to:
receive a third input; and
perform image editing on image content in the first screen capture boxes in response to the third input.

Optionally, the at least two first screen capture boxes include a first screen capture sub-box and a second screen capture sub-box; and the screen capture apparatus 200 further includes:
a first splicing module, configured to splice first sub-image content in the first screen capture sub-box and second sub-image content in the second screen capture sub-box in a case that a fourth input performed on the first screen capture sub-box and the second screen capture sub-box is received, where
the screenshot includes the first sub-image content and the second sub-image content.

Optionally, the display module 202 is further configured to:
in a case that a fifth input is received, display a second display interface, and display a first control on the second display interface;
display at least two second screen capture boxes on the second display interface in a case that a sixth input performed on the second display interface is received; and
display a target editing interface in a case that a seventh input performed on the first control is received, where the target editing interface includes the target screen capture box, and the target screen capture box includes the first screen capture boxes and the second screen capture boxes.

Optionally, the screen capture apparatus 200 further includes:
a second splicing module, configured to: splice first image content in at least one of the first screen capture boxes and second image content in at least one of the second screen capture boxes in a case that an eighth input performed on the target editing interface is received, where the screenshot includes the first image content and the second image content.

Optionally, the screen capture apparatus 200 further includes:
an indication module, configured to: in a case that a ninth input performed on a target screenshot is received, display an indication label associated with the target screenshot, where the indication label is used to indicate a target application corresponding to the target screenshot.

Optionally, the display module 202 is further configured to:
display a target running interface of the target application in a case that a tenth input performed on the indication label is received, where the target running interface is the first display interface.

Optionally, the output module 203 is further configured to:
separately perform a screen capture operation on image content determined by the at least two first screen capture boxes, and output at least two screenshots, where a quantity of the at least two screenshots is the same as a quantity of the at least two first screen capture boxes.

According to the screen capture apparatus 200 provided in this embodiment of this application, in a case that a first display interface is displayed, at least two first screen capture boxes can be displayed based on a first input of a user; and when a second input is received, screen capture operations can be performed on image content determined by target screen capture boxes in the at least two first screen capture boxes, thereby obtaining screenshots. In this way, the user can obtain screenshots of different regions of a same display interface by performing a screen capture operation once, instead of performing the screen capture operation a plurality of times. This effectively simplifies user's operations, makes the screen capture operation more flexible, and improves the efficiency of screen capture processing.

The screen capture apparatus 200 in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (ultra-mobile personal computer, UMPC), a netbook, a personal digital assistant (personal digital assistant, PDA), or the like. The non-mobile electronic device may be a server, a network attached storage (Network Attached Storage, NAS), a personal computer (personal computer, PC), a television (television, TV), a teller machine, a self-service machine, or the like. This is not specifically limited in the embodiments of this application.

The screen capture apparatus 200 in this embodiment of this application may be an apparatus with an operating system. The operating system may be an Android (Android) operating system, an iOS operating system, or another possible operating system, which is not specifically limited in this embodiment of this application.

The screen capture apparatus 200 provided in this embodiment of this application can implement the processes implemented in the screen capture method embodiment in FIG. 1a. To avoid repetition, details are not described herein again.

Figure 3:
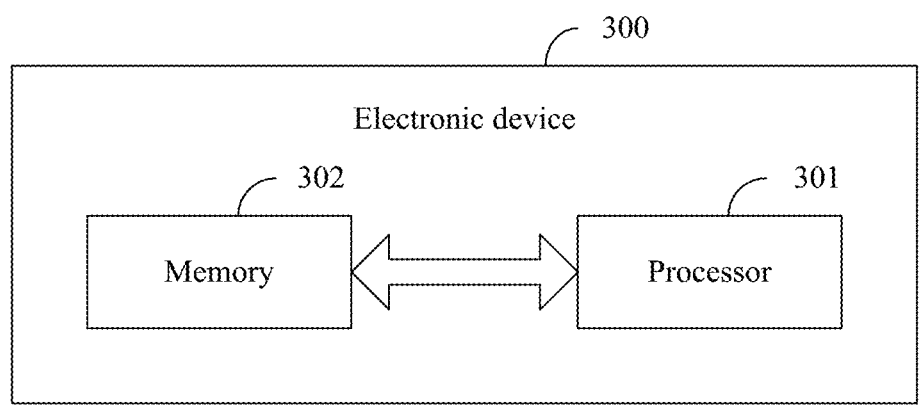
FIG. 3 is a structural diagram of an electronic device according to an embodiment of this application.

Optionally, as shown in FIG. 3, an embodiment of this application further provides an electronic device 300, including a processor 301, a memory 302, and a program or instructions stored in the memory 302 and executable by the processor 301. When the program or instructions are executed by the processor 301, the processes of the foregoing screen capture method embodiments are implemented, with the same technical effects achieved. To avoid repetition, details are not described herein again.

It should be noted that the electronic device 300 in this embodiment of this application includes the mobile electronic device and the non-mobile electronic device that are described above.

Figure 4:
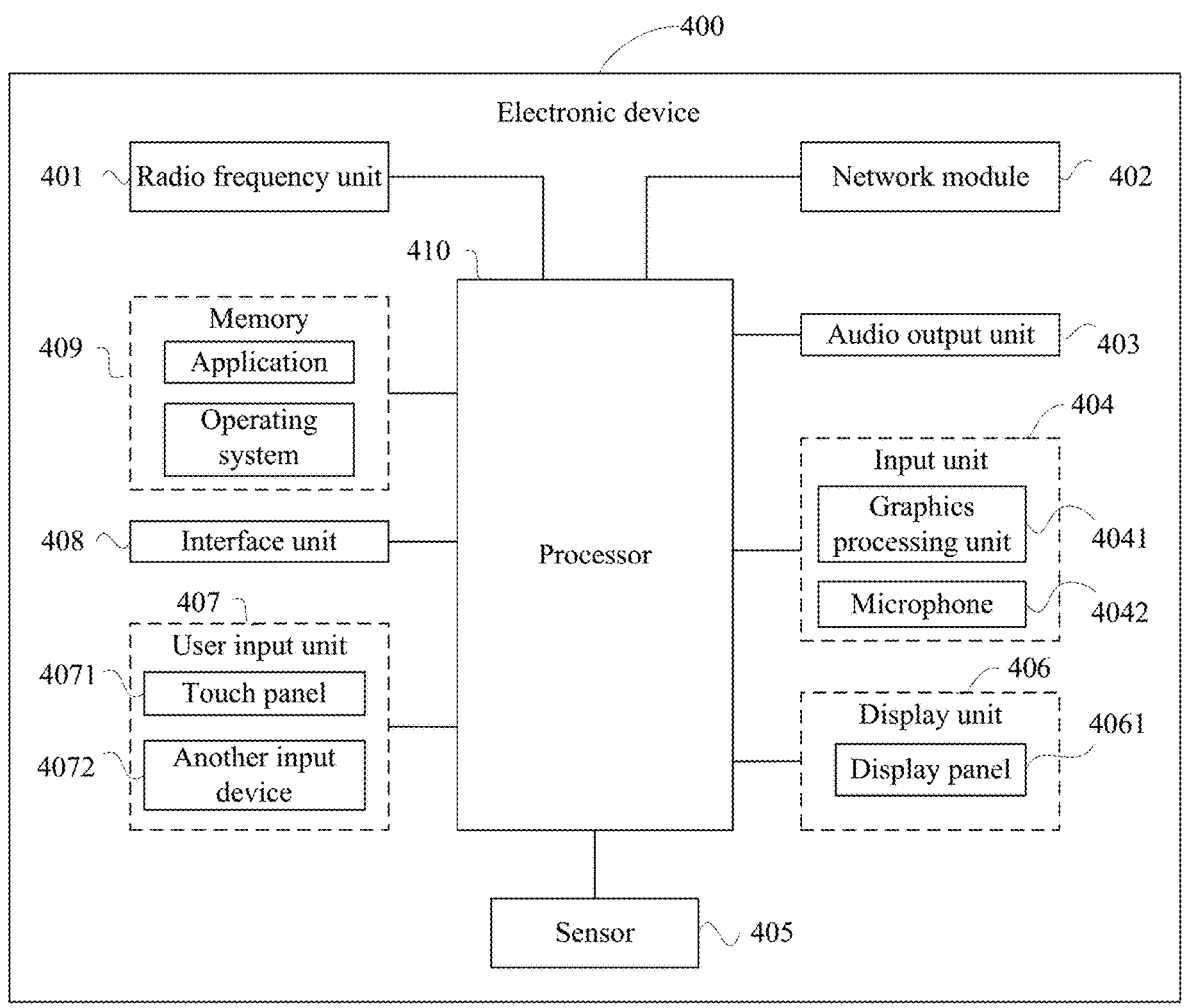
FIG. 4 is a structural diagram of another electronic device according to an embodiment of this application.

FIG. 4 is a schematic diagram of a hardware structure of an electronic device for implementing embodiments of this application.

The electronic device 400 includes but is not limited to components such as a radio frequency unit 401, a network module 402, an audio output unit 403, an input unit 404, a sensor 405, a display unit 406, a user input unit 407, an interface unit 408, a memory 409, and a processor 410.

It may be understood by a person skilled in the art that the electronic device 400 may further include a power supply (such as a battery) that supplies power to each component. The power supply may be logically connected to the processor 410 by using a power management system, to implement functions such as charging, discharging, and power consumption management by using the power management system. The structure of the electronic device shown in FIG. 4 does not constitute a limitation on the electronic device. The electronic device may include components more or fewer than those shown in the figure, or some components may be combined, or there may be a different component arrangement. Details are not described herein.

The display unit 406 is configured to: in a case that a first display interface is displayed, receive a first input performed on the first display interface; and
    display at least two first screen capture boxes on the first display interface in response to the first input.

The processor 410 is configured to: in a case that a second input is received, perform a screen capture operation on image content determined by a target screen capture box, and output a screenshot, where
    the target screen capture box includes the first screen capture boxes.

Optionally, the processor 410 is further configured to: receive a third input; and perform image editing on image content in the first screen capture boxes in response to the third input.

Optionally, the first screen capture boxes include a first screen capture sub-box and a second screen capture sub-box.

The processor 410 is further configured to splice first sub-image content in the first screen capture sub-box and second sub-image content in the second screen capture sub-box in a case that a fourth input performed on the first screen capture sub-box and the second screen capture sub-box is received, where
    the screenshot includes the first sub-image content and the second sub-image content.

Optionally, the display unit 406 is further configured to: in a case that a fifth input is received, display a second display interface, and display a first control on the second display interface;
    display at least two second screen capture boxes on the second display interface in a case that a sixth input performed on the second display interface is received; and
    display a target editing interface in a case that a seventh input performed on the first control is received, where the target editing interface includes the target screen capture box, and the target screen capture box includes the first screen capture boxes and the second screen capture boxes.

Optionally, the processor 410 is further configured to splice first image content in at least one of the first screen capture boxes and second image content in at least one of the second screen capture boxes in a case that an eighth input performed on the target editing interface is received, where
    the screenshot includes the first image content and the second image content.

Optionally, the display unit 406 is further configured to: in a case that a ninth input performed on a target screenshot is received, display an indication label associated with the target screenshot, where the indication label is used to indicate a target application corresponding to the target screenshot. Optionally, the display unit 406 is further configured to display a target running interface of the target application in a case that a tenth input performed on the indication label is received, where the target running interface is the first display interface.

Optionally, the target screen capture box is the at least two first screen capture boxes. The processor 410 is further configured to: separately perform a screen capture operation on image content determined by the at least two first screen capture boxes, and output at least two screenshots, where a quantity of the at least two screenshots is the same as a quantity of the at least two first screen capture boxes.

In this embodiment of this application, in a case that a first display interface is displayed, the electronic device 400 can display at least two first screen capture boxes based on a first input of a user; and when a second input is received, perform a screen capture operation on image content determined by target screen capture boxes in the at least two first screen capture boxes, thereby obtaining screenshots. In this way, the user can obtain screenshots of different regions of a same display interface by performing a screen capture operation once, instead of performing the screen capture operation a plurality of times. This effectively simplifies user's operations, makes the screen capture operation more flexible, and improves the efficiency of screen capture processing.

It should be understood that, in this embodiment of this application, the input unit 404 may include a graphics processing unit (Graphics Processing Unit, GPU) 4041 and a microphone 4042; and the graphics processing unit 4041 processes image data of a still picture or a video obtained by an image capture apparatus (such as a camera) in a video capture mode or an image capture mode. The display unit 406 may include a display panel 4061. The display panel 4061 may be configured in a form of a liquid crystal display, an organic light-emitting diode, or the like. The user input unit 407 includes a touch panel 4071 and another input device 4072. The touch panel 4071 is also referred to as a touchscreen. The touch panel 4071 may include two parts: a touch detection apparatus and a touch controller. The another input device 4072 may include but is not limited to a physical keyboard, a functional button (such as a volume control button or a power on/off button), a trackball, a mouse, and a joystick. Details are not described herein. The memory 409 may be configured to store a software program and various data, including but not limited to an application program and an operating system. The processor 410 may be integrated with an application processor and a modem processor. The application processor mainly processes an operating system, a user interface, an application program, and the like. The modem processor mainly processes wireless communication. It can be understood that, alternatively, the modem processor may not be integrated into the processor 410.

An embodiment of this application further provides a readable storage medium. The readable storage medium stores a program or instructions. When the program or instructions are executed by a processor, the processes of the foregoing screen capture method embodiment in FIG. 1a are implemented, with the same technical effect achieved. To avoid repetition, details are not described herein again.

The processor is a processor in the electronic device in the foregoing embodiment. The readable storage medium includes a computer-readable storage medium, for example, a computer read-only memory (Read-Only Memory, ROM), a random access memory (Random Access Memory, RAM), a magnetic disk, or an optical disc.

An embodiment of this application further provides a chip. The chip includes a processor and a communication interface. The communication interface is coupled to the processor. The processor is configured to run a program or instructions to implement the processes of the foregoing screen capture method embodiment in FIG. 1a, with the same technical effects achieved. To avoid repetition, details are not described herein again.

It should be understood that the chip mentioned in this embodiment of this application may also be referred to as a system-level chip, a system chip, a chip system, or a system on a chip.

It should be noted that, in this specification, the terms "include", "comprise", or any of their variants are intended to cover a non-exclusive inclusion, so that a process, a method, an article, or an apparatus that includes a series of elements includes not only those elements but also other elements that are not expressly listed, or further includes elements inherent to such a process, method, article, or apparatus. In the absence of more restrictions, an element defined by the statement "including a . . . " does not preclude the presence of other identical elements in the process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the foregoing descriptions of the implementations, a person skilled in the art may clearly understand that the method in the foregoing embodiments may be implemented by using software in addition to a necessary universal hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the method described in the embodiments of this application.

The embodiments of this application are described above with reference to the accompanying drawings, but this application is not limited to the foregoing specific implementations. The foregoing specific implementations are merely illustrative instead of restrictive. Under the enlightenment of this application, a person of ordinary skill in the art may make many forms without departing from the essence of this application and the protection scope of claims, all of which fall within the protection of this application.

What is claimed is:

1. A screen capture method, comprising:
in a case that a first display interface is displayed, receiving a first input performed on the first display interface;
displaying at least two first screen capture boxes on the first display interface in response to the first input; and
in a case that a second input is received, performing a screen capture operation on image content determined by a target screen capture box, and outputting a screenshot, wherein
the target screen capture box comprises the first screen capture boxes,
wherein before the performing a screen capture operation on image content determined by a target screen capture box and outputting a screenshot in a case that a second input is received, the method further comprises:
in a case that a third input is received, displaying a second display interface, and displaying a first control on the second display interface;
displaying at least two second screen capture boxes on the second display interface in a case that a fourth input performed on the second display interface is received; and displaying a target editing interface in a case that a fifth input performed on the first control is received, wherein the target editing interface comprises the target screen capture box, and the target screen capture box comprises the first screen capture boxes and the second screen capture boxes.

2. The method according to claim 1, wherein before the performing a screen capture operation on image content determined by a target screen capture box and outputting a screenshot in a case that a second input is received, the method further comprises:
receiving a sixth input; and
performing image editing on image content in the first screen capture boxes in response to the sixth input.

3. The method according to claim 1, wherein the at least two first screen capture boxes comprise a first screen capture sub-box and a second screen capture sub-box; and
before the performing a screen capture operation on image content determined by a target screen capture box and outputting a screenshot in a case that a second input is received, the method further comprises:
splicing first sub-image content in the first screen capture sub-box and second sub-image content in the second screen capture sub-box in a case that a seventh input performed on the first screen capture sub-box and the second screen capture sub-box is received, wherein
the screenshot comprises the first sub-image content and the second sub-image content.

4. The method according to claim 1, wherein after the displaying a target editing interface, and before the performing a screen capture operation on image content determined by a target screen capture box and outputting a screenshot in a case that a second input is received, the method further comprises:
splicing first image content in at least one of the first screen capture boxes and second image content in at least one of the second screen capture boxes in a case that an eighth input performed on the target editing interface is received, wherein
the screenshot comprises the first image content and the second image content.

5. The method according to claim 1, wherein after the performing a screen capture operation on image content determined by a target screen capture box and outputting a screenshot in a case that a second input is received, the method further comprises:
in a case that a ninth input performed on a target screenshot is received, displaying an indication label associated with the target screenshot, wherein the indication label is used to indicate a target application corresponding to the target screenshot.

6. The method according to claim 5, wherein after the displaying an indication label associated with the target screenshot, the method further comprises:
displaying a target running interface of the target application in a case that a tenth input performed on the indication label is received, wherein the target running interface is the first display interface.

7. The method according to claim 1, wherein the performing a screen capture operation on image content determined by a target screen capture box and outputting a screenshot comprises:
separately performing a screen capture operation on image content determined by the at least two first screen capture boxes, and outputting at least two screenshots, wherein a quantity of the at least two screenshots is the same as a quantity of the at least two first screen capture boxes.

8. An electronic device, comprising a processor, a memory, and a program or instructions stored in the memory and executable by the processor, wherein when the program or instructions are executed by the processor, the processor is configured to:
in a case that a first display interface is displayed, receive a first input performed on the first display interface;
display at least two first screen capture boxes on the first display interface in response to the first input; and
in a case that a second input is received, perform a screen capture operation on image content determined by a target screen capture box, and output a screenshot, wherein
the target screen capture box comprises the first screen capture boxes,
wherein before the performing a screen capture operation on image content determined by a target screen capture box and outputting a screenshot in a case that a second input is received, the processor is configured to:
in a case that a third input is received, display a second display interface, and display a first control on the second display interface;
display at least two second screen capture boxes on the second display interface in a case that a fourth input performed on the second display interface is received; and
display a target editing interface in a case that a fifth input performed on the first control is received, wherein the target editing interface comprises the target screen capture box, and the target screen capture box comprises the first screen capture boxes and the second screen capture boxes.

9. The electronic device according to claim 8, wherein, before the performing a screen capture operation on image content determined by a target screen capture box and outputting a screenshot in a case that a second input is received, the processor is configured to:
receive a sixth input; and
perform image editing on image content in the first screen capture boxes in response to the third sixth input.

10. The electronic device according to claim 8, wherein the at least two first screen capture boxes comprise a first screen capture sub-box and a second screen capture sub-box; and
before the performing a screen capture operation on image content determined by a target screen capture box and outputting a screenshot in a case that a second input is received, the processor is configured to:
splice first sub-image content in the first screen capture sub-box and second sub-image content in the second screen capture sub-box in a case that a seventh input performed on the first screen capture sub-box and the second screen capture sub-box is received, wherein
the screenshot comprises the first sub-image content and the second sub-image content.

11. The electronic device according to claim 10, wherein after the displaying a target editing interface, and before the performing a screen capture operation on image content determined by a target screen capture box and outputting a screenshot in a case that a second input is received, the processor is configured to:
splice first image content in at least one of the first screen capture boxes and second image content in at least one of the second screen capture boxes in a case that an eighth input performed on the target editing interface is received, wherein the screenshot comprises the first image content and the second image content.

12. The electronic device according to claim 8, wherein, after the performing a screen capture operation on image content determined by a target screen capture box and outputting a screenshot in a case that a second input is received, the processor is configured to:

in a case that a ninth input performed on a target screenshot is received, display an indication label associated with the target screenshot, wherein the indication label is used to indicate a target application corresponding to the target screenshot.

13. The electronic device according to claim 12, wherein after the displaying an indication label associated with the target screenshot, the processor is configured to:

display a target running interface of the target application in a case that a tenth input performed on the indication label is received, wherein the target running interface is the first display interface.

14. The electronic device according to claim 8, wherein the performing a screen capture operation on image content determined by a target screen capture box and outputting a screenshot comprises:

separately performing a screen capture operation on image content determined by the at least two first screen capture boxes, and output at least two screenshots, wherein a quantity of the at least two screenshots is the same as a quantity of the at least two first screen capture boxes.

15. A non-transitory readable storage medium, wherein the readable storage medium stores a program or instructions, and the program or instructions, when being executed by a processor, causes the processor to perform the following steps:

in a case that a first display interface is displayed, receiving a first input performed on the first display interface;

displaying at least two first screen capture boxes on the first display interface in response to the first input; and in a case that a second input is received, performing a screen capture operation on image content determined by a target screen capture box, and outputting a screenshot, wherein the target screen capture box comprises the first screen capture boxes, wherein, before the performing a screen capture operation on image content determined by a target screen capture box and outputting a screenshot in a case that a second input is received, the program or instructions causes the processor to perform the following steps:

in a case that a third input is received, displaying a second display interface, and displaying a first control on the second display interface;

displaying at least two second screen capture boxes on the second display interface in a case that a fourth input performed on the second display interface is received; and displaying a target editing interface in a case that a fifth input performed on the first control is received, wherein the target editing interface comprises the target screen capture box, and the target screen capture box comprises the first screen capture boxes and the second screen capture boxes.

16. The non-transitory readable storage medium according to claim 15, wherein before the performing a screen capture operation on image content determined by a target screen capture box and outputting a screenshot in a case that a second input is received, the program or instructions causes the processor to perform the following steps:

receiving a sixth input; and performing image editing on image content in the first screen capture boxes in response to the sixth input.

17. The non-transitory readable storage medium according to claim 15, wherein the at least two first screen capture boxes comprise a first screen capture sub-box and a second screen capture sub-box; and before the performing a screen capture operation on image content determined by a target screen capture box and outputting a screenshot in a case that a second input is received, the program or instructions causes the processor to perform the following steps:

splicing first sub-image content in the first screen capture sub-box and second sub-image content in the second screen capture sub-box in a case that a seventh input performed on the first screen capture sub-box and the second screen capture sub-box is received, wherein the screenshot comprises the first sub-image content and the second sub-image content.

\* \* \* \* \*